(12) United States Patent
Ganesan et al.

(10) Patent No.: US 11,520,986 B2
(45) Date of Patent: Dec. 6, 2022

(54) NEURAL-BASED ONTOLOGY GENERATION AND REFINEMENT

(71) Applicant: International Business Machines Corporation, Armonk, NY (US)

(72) Inventors: Balaji Ganesan, Bengaluru (IN); Riddhiman Dasgupta, Bangalore (IN); Akshay Parekh, Dhamtari (IN); Hima Patel, Bengaluru (IN); Berthold Reinwald, San Jose, CA (US); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 16/937,641

(22) Filed: Jul. 24, 2020

(65) Prior Publication Data
US 2022/0027561 A1    Jan. 27, 2022

(51) Int. Cl.
*G06F 40/169*    (2020.01)
*G06F 40/295*    (2020.01)
*G06N 3/04*    (2006.01)
*G06F 16/36*    (2019.01)

(52) U.S. Cl.
CPC .......... *G06F 40/295* (2020.01); *G06F 16/367* (2019.01); *G06N 3/04* (2013.01)

(58) Field of Classification Search
CPC ........ G06F 16/367; G06F 40/30; G06F 16/36; G06F 40/289; G06F 40/20; G06F 16/24578; G06F 16/245; G06F 16/30; G06F 40/237; G06F 16/9024; G06F 16/3338; G06F 16/3329; G06N 5/02; G06N 20/00; G06N 5/04; G06N 3/02; G06N 3/08; G06N 5/046; G06N 3/0454; G06N 3/0445; G06N 5/025
See application file for complete search history.

(56) References Cited

U.S. PATENT DOCUMENTS 7,987,088 B2   7/2011 Moitra et al.
10,242,320 B1 * 3/2019 Elkholy ................. G06F 16/93
11,295,232 B2 * 4/2022 Chickering ............ G06F 16/30
(Continued)

FOREIGN PATENT DOCUMENTS

CN    106776711 A    5/2017

OTHER PUBLICATIONS

Benjamin et al, "Methods for Ontology-Driven Integration", 2006, InIC-AI Jun. 2006 (pp. 10-16).*
(Continued)

*Primary Examiner* — Olujimi A Adesanya
(74) *Attorney, Agent, or Firm* — Eric Chesley

(57) ABSTRACT

Aspects of the present disclosure relate to neural-based ontology generation and refinement. A set of input data can be received. A set of entities can be extracted from the set of input data using a named-entity recognition (NER) process, each entity having a corresponding label, the corresponding labels making up a label set. The label set can be compared to concepts in a set of reference ontologies. Labels that match to concepts in the set of reference ontologies can be selected as a candidate concept set. Relations associated with the candidate concepts within the set of reference ontologies can be identified as a candidate relation set. An ontology can then be generated using the candidate concept set and candidate relation set.

12 Claims, 9 Drawing Sheets

(56) References Cited

U.S. PATENT DOCUMENTS

| | | | | |
|---|---|---|---|---|
| 2013/0018828 | A1* | 1/2013 | He | G06F 16/353 706/46 |
| 2013/0066921 | A1* | 3/2013 | Mark | G06F 16/367 707/794 |
| 2013/0260358 | A1* | 10/2013 | Lorge | G06F 16/367 434/362 |
| 2014/0229163 | A1* | 8/2014 | Gliozzo | G06F 40/30 704/9 |
| 2015/0178273 | A1* | 6/2015 | Hakkani-Tur | G06F 40/40 704/9 |
| 2016/0179945 | A1* | 6/2016 | Lastra Diaz | G06F 16/284 707/739 |
| 2016/0217128 | A1* | 7/2016 | Baum | G06F 40/289 |
| 2017/0278514 | A1* | 9/2017 | Mathias | G06F 16/35 |
| 2017/0329760 | A1 | 11/2017 | Rachevsky | |
| 2018/0082197 | A1* | 3/2018 | Aravamudan | G06N 5/022 |
| 2018/0232443 | A1* | 8/2018 | Delgo | G06F 40/295 |
| 2018/0260476 | A1* | 9/2018 | Bar-Haim | G06F 16/93 |
| 2019/0155924 | A1 | 5/2019 | Guggilla et al. | |
| 2019/0163818 | A1* | 5/2019 | Mittal | G06N 5/02 |
| 2020/0342055 | A1* | 10/2020 | Patra | G06N 5/003 |
| 2021/0012179 | A1* | 1/2021 | Kalia | G06F 40/289 |

OTHER PUBLICATIONS

Clarkson et al, "User-centric ontology population", 2018, InEuropean Semantic Web Conference Jun. 3, 2018 (pp. 112-127).*

Tun NN et al, "Ontology Generation through the Fusion of Partial Reuse and Relation Extraction", 2008, InKR Sep. 16, 2008 (pp. 318-328).*

Shimaoka et al, "An attentive neural architecture for fine-grained entity type classification", 2016, arXiv preprint arXiv:1604.05525. Apr. 19, 2016, pp. 69-74.*

Gao et al, "Cosine-Based Embedding for Completing Schematic Knowledge", Oct. 2019,. InCCF International Conference on Natural Language Processing and Chinese Computing Oct. 9, 2019 (pp. 249-261). Springer, Cham.*

Chen, "Multi-relational Representation Learning and Knowledge Acquisition", 2019, Dissertation University of California, Los Angeles; 2019, pp. 1-210.*

Abhishek et al, "Collective learning from diverse datasets for entity typing in the wild", Oct. 2018, arXiv preprint arXiv:1810.08782. Oct. 20, 2018., pp. 1-8.*

Lample et al, "Neural architectures for named entity recognition", 2016, arXiv preprint arXiv:1603.01360. Mar. 4, 2016, pp. 1-11.*

Dasgupta et al., "Fine Grained Classification of Personal Data Entities", Nov. 23, 2018, 8 pages.

Abhishek et al., "Collective Learning From Diverse Datasets for Entity Typing in the Wild", Conference'17, Jul. 2017, 8 pages.

Kannan et al., "Document Structure Measure for Hypernym discovery", Nov. 30, 2018, 7 pages.

Unknown, "Relation Extraction from text for Ontology Creation", Copyright 2019, Association for the Advancement of Artificial Intelligence, 3 pages.

Kim et al., "Ranking the Importance of Ontology Concepts Using Document Summarization Techniques", 2017 IEEE International Conference on Big Data (BIGDATA), Dec. 11-14, 2017, pp. 1457-1466.

Jammi et al., "Tooling Framework for Instantiating Natural Language Querying System", Proceedings of the VLDB Endowment, vol. 11, No. 12, 2018, pp. 2014-2017.

Gantayat et al., "Goal-based Ontology Creation for Natural Language Querying in SAP-ERP Platform", 6th ACM IKDD CoDS and 24th COMAD (CoDS-COMAD'19), Jan. 3-5, 2019, 7 pages.

Petrucci et al., "Ontology learning in the deep", European Knowledge Acquisition Workshop, Conference paper First Online: Nov. 4, 2016, Abstract Only, 5 pages.

Vedula et al., "BOLT-K: Bootstrapping Ontology Learning via Transfer of Knowledge", WWW '19, May 13-17, 2019, 12 pages.

Unknown, "data-discovery/anu-ontology", printed May 6, 2020, 1 page <https://github.ibm.com/data-discovery/anu-ontology>.

Shimaoka et al., "Neural Architectures for Fine-grained Entity Type Classification", Proceedings of the 15th Conference of the European Chapter of the Association for Computational Linguistics: vol. 1, Long Papers, Apr. 3-7, 2017, pp. 1271-1280.

Abhishek et al., "A Unified Labeling Approach by Pooling Diverse Datasets for Entity Typing", Submitted on Oct. 20, 2018, 15 pages.

Mehta et al., "Scalable Knowledge Graph Construction over Text using Deep Learning based Predicate Mapping", The Web Conference 2019, Report No. IIIT/TR/2019/-1, May 2019, 10 pages.

Chen et al., "On2vec: Embedding-based relation prediction for ontology population", Sep. 7, 2018, 9 pages.

Agarwal et al., "Cognitive Compliance for Financial Regulations", IT Pro, Jul./Aug. 2017, pp. 28-35.

Ganesan et al., "A Neural Architecture for Person Ontology Population", Jan. 22, 2020, 6 pages.

* cited by examiner

NEURAL-BASED ONTOLOGY GENERATION AND REFINEMENT

BACKGROUND

The present disclosure relates generally to the field of ontologies, and more particularly to ontology generation and refinement.

Ontologies are used to compartmentalize and relate representational knowledge. In the broadest aspect, an ontology is a domain representation. The domain representation includes concepts (e.g., actors playing roles in the domain), relations (e.g., relationships between concepts), and attributes (e.g., concept properties). Ontologies can be applied for information retrieval, such as in Q/A systems.

SUMMARY

Aspects of the present disclosure relate to a method, system, and computer program product for ontology generation and refinement. A set of input data can be received. A set of entities can be extracted from the set of input data using a named-entity recognition (NER) process, each entity having a corresponding label, the corresponding labels making up a label set. The label set can be compared to concepts in a set of reference ontologies. Labels that match to concepts in the set of reference ontologies can be selected as a candidate concept set. Relations associated with the candidate concepts within the set of reference ontologies can be identified as a candidate relation set. An ontology can then be generated using the candidate concept set and candidate relation set.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
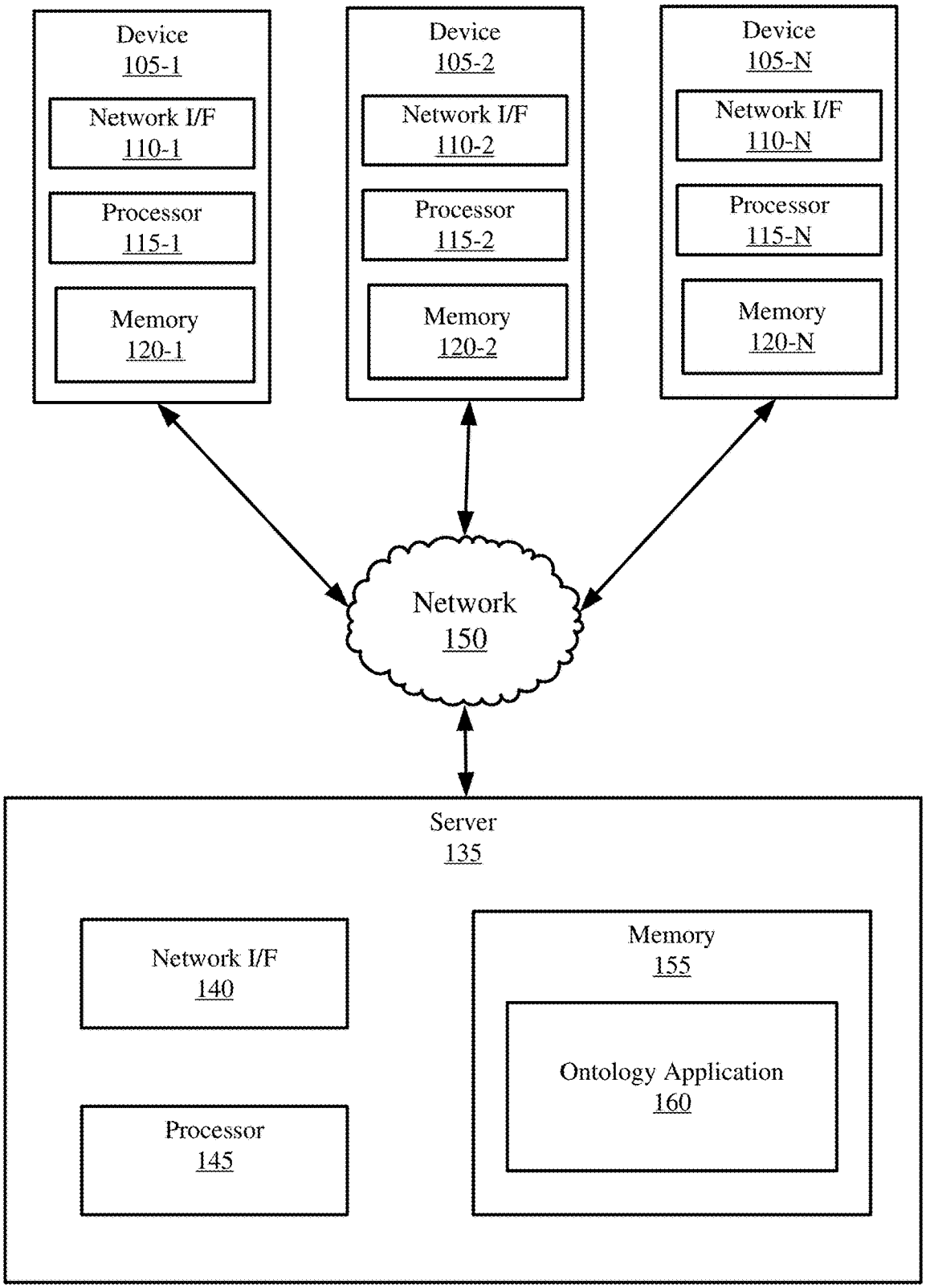
FIG. 1 is a block diagram illustrating an example computing environment in which illustrative embodiments of the present disclosure can be implemented.

Aspects of the present disclosure relate generally to ontologies, and more particularly to neural-based ontology generation and refinement. While the present disclosure is not necessarily limited to such applications, various aspects of the disclosure can be appreciated through a discussion of various examples using this context.

Ontologies are used to compartmentalize and relate representational knowledge. Ontology domains include concepts (e.g., actors playing roles in the domain), functional relations between the concepts, and attributes indicating characteristics of the concepts. Ontologies can be visually represented by a knowledge graph (KG), which illustrates the relations (e.g., hierarchical and functional relations) between concepts present in the ontology domain. Ontologies can be applied in computing environments to organize and interrelate data. Specifically, ontologies can be used for information retrieval, and may be used in Question/Answer (Q/A) systems.

Ontology learning (OL) is employed to automatically (or semi-automatically) generate ontologies from input data. OL includes extracting domain terminology, discovering concepts, deriving concept hierarchy, learning non-taxonomic relations, discovering aliases, and populating the ontology. The OL process begins with acquiring information needed to generate the ontology through domain terminology extraction. Various techniques can be used to pull data (e.g., structured, semi-structured, or unstructured data) from input sources, including natural language processing (NLP) techniques, clustering techniques, machine learning, etc. The input data is then analyzed (e.g., morphological analysis, lexical analysis, semantic analysis, hierarchical analysis, etc.) to properly organize and interrelate the extracted input data. Finally, the ontology is populated based on the analysis.

Though the OL process can build an ontology, improvements can be made to the accuracy (e.g., the placement and classification of terms) and completeness of the ontology. Further still, improvements can be made to the OL process such that the ontology converges on concepts and/or relations that are relevant for the input corpus. As such, aspects of the present disclosure recognize that an ontology should be accurately and thoroughly populated based on an input corpus. However, the ontology should ideally concisely cover the input corpus, such that extraneous concepts, relations, and attributes are not present in the ontology. This can aid with information retrieval if the ontology is queried for subject matter relevant to the input corpus. For example, by building an ontology using the above principles, the processing time required to retrieve information from the ontology can be reduced, the storage required for the ontology can be reduced, and the accuracy of responses to queries can be increased, among other benefits.

Aspects of the present disclosure relate to ontology generation and refinement. A set of input data can be received. A set of entities can be extracted from the set of input data using a named-entity recognition (NER) process, each entity having a corresponding label, the corresponding labels making up a label set. The label set can be compared to concepts in a set of reference ontologies. Labels that match to concepts in the set of reference ontologies can be selected as a candidate concept set. Relations associated with the candidate concepts within the set of reference ontologies can be identified as a candidate relation set. An ontology can then be generated using the candidate concept set and candidate relation set.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 are configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardware connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes an ontology application 160. The ontology application 160 can be configured to generate an ontology using an input data corpus. In particular, the ontology application 160 can be configured to extract entities (e.g., a named-entity such as a person, organization name, or location) and entity types (e.g., categories or labels describing the entity) from an input data corpus, classify the extracted entity types into concepts, identify relations between the concepts, and identify attributes of concepts. Thereafter, an ontology can be populated using the concepts, attributes, and relations. The ontology can then be refined, for example, to converge the set of relations to those relevant to the input corpus.

In embodiments, the ontology application 160 utilizes one or more neural network models for classification. An Artificial Neural Network (ANN) (also referred to more generally as a neural network) is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex, but on much smaller scales. Such systems progressively and autonomously learn tasks by means of examples, and they have successfully been applied to, for example, speech recognition, text processing and computer vision. A large ANN might have hundreds or thousands of processor units, whereas a mammalian brain has billions of neurons with a corresponding increase in magnitude of their overall interaction and emergent behavior. Ultimately, neural networks can be used to recognize numerical patterns in data. For example, neural networks can group unlabeled data according to similarities among inputs and thereafter classify data with labels.

Figure 6:
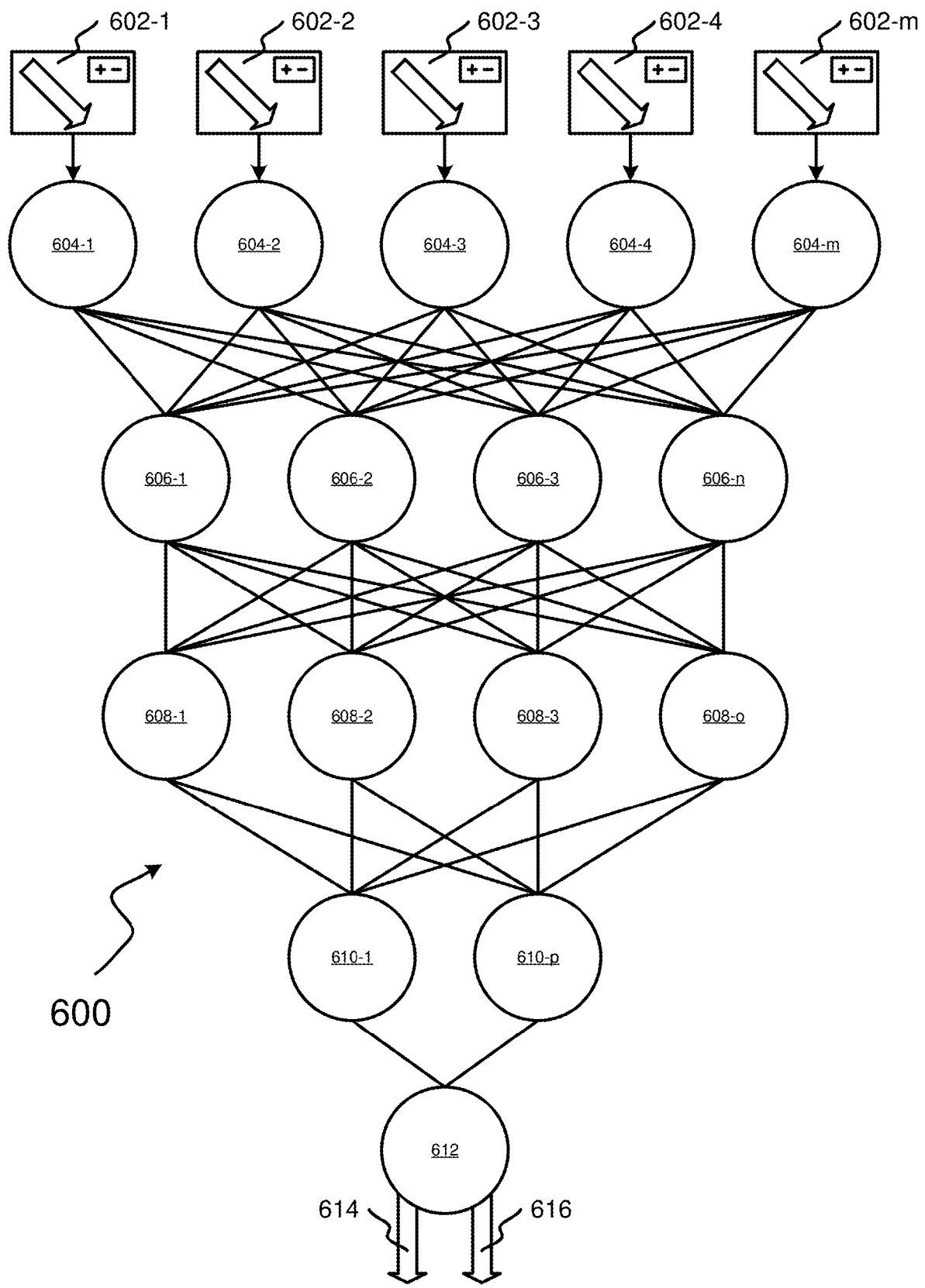
FIG. 6 is a diagram illustrating an example neural network that can be used to classify input data, in accordance with embodiments of the present disclosure.

Many types of neural networks are known, starting with feedforward neural networks, such as multilayer perceptrons, deep learning neural networks (DNNs), and convolutional neural networks. A feedforward neural network is an artificial neural network (ANN) where connections between the units do not form a cycle. A deep learning neural network is an artificial neural network with multiple hidden layers of units between the input and output layers. Similar to shallow ANNs, DNNs can model complex non-linear relationships. DNN architectures generate compositional models where the object is expressed as a layered composition of primitives. The extra layers enable composition of features from lower layers, giving the potential of modeling complex data with fewer units than a similarly performing shallow network. FIG. 6 illustrates an example neural network 600 architecture that may be used to execute functionalities described herein.

In embodiments, the ontology application 160 analyzes one or more reference ontologies to facilitate the selection and classification of concepts and relations populated in the ontology. That is, ontologies from various domains (e.g., medicine, health, computer science, politics, biology, etc.) can be referenced with respect to extracted entity types from an input data corpus such that concepts and relations mapping to the entity types can be identified. In embodiments, the selection of concepts and relations that extracted entity types are mapped to can be completed using at least one neural model.

By using reference ontologies to select from a pool of concepts and relations, the large number of entity types (e.g., fine-grained entity types) received from one or more named-entity recognition (NER) can be narrowed. As such, an ontology can be tailored to a particular corpus by mapping the entity types to those already present in finalized ontologies. Any fine-grained entity types which are not present in one or more reference ontologies can be removed from incorporation to the ontology. In this regard, the generated ontology can maintain a relatively course make-up (e.g., the ontology may not include fine-grained concepts that may be irrelevant, redundant, or inaccurate). However, because the ontology is built based on labels received directly from an NER algorithm run on input data, the ontology is tailored specifically to the input data.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
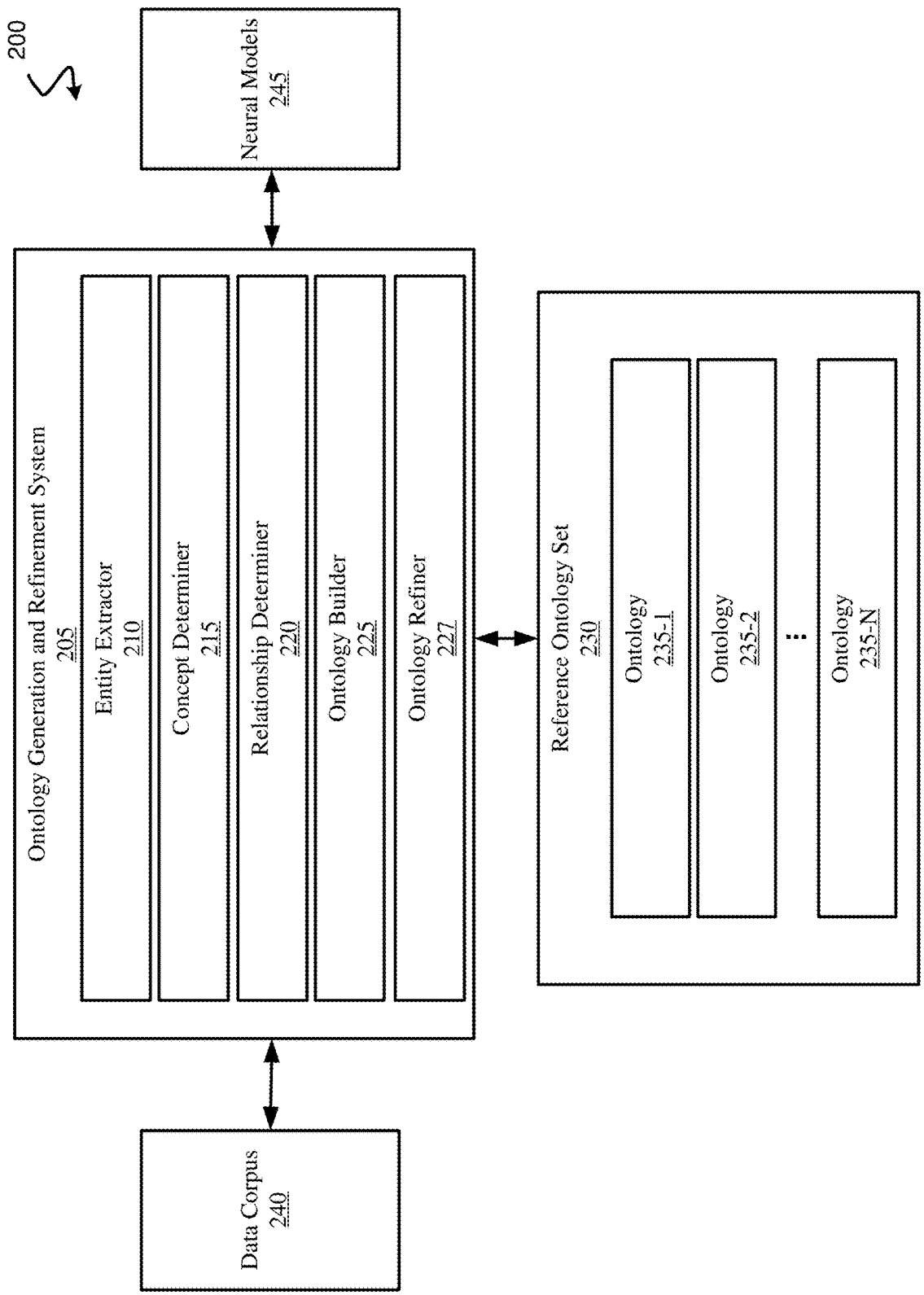
FIG. 2 is a block diagram illustrating an example computing environment in which illustrative embodiments of the present disclosure can be implemented.

Referring now to FIG. 2, shown is a block diagram of an example computing environment 200 in which illustrative embodiments of the present disclosure may be implemented. The computing environment 200 includes an ontology generation and refinement system (OGRS) 205, a reference ontology set 230, a data corpus 240, and neural models 245.

The OGRS 205 can be configured to receive data from a data corpus 240. The data corpus 240 can include various structured and unstructured data. For example, the data corpus 240 can include data such as documents (e.g., medical documents, regulatory documents, encyclopedias, etc.), images, videos, transcripts, audio segments, and the like. In embodiments, the OGRS 205 can include data processing functionalities such that the input data can be formatted, converted, or otherwise structured into a suitable form for analysis. For example, audio data can be converted into text, text can be extracted from images, unstructured documents can be structured, sentences can be extracted from text, etc. prior to analysis by the OGRS 205.

The reference ontology set 230 includes a plurality of ontologies 235-1, 235-2 . . . 235-N (herein collectively referred to as ontologies 235). In embodiments, ontologies 235 within the reference ontology set 230 can be pre-populated, finalized, and/or polished ontologies configured to perform information retrieval within a particular domain. In embodiments, ontologies 235 can cover distinct domains. For example, ontology 235-1 can be specialized for the medical domain, ontology 235-2 can be specialized for the political domain, ontology 235-3 can be specialized for the business domain, etc. A variety of reference ontological domains can aid with accurate concept and relation classification by the OGRS 205, to be discussed further below. Examples of ontologies that can be referenced include Systematized Nomenclature of Medicine (SNOMED®), Financial Industry Business Ontology (FIBO), and others.

The OGRS 205 includes an entity extractor 210, a concept determiner 215, a relationship determiner 220, an ontology builder 225, and an ontology refiner 227. In embodiments, the entity extractor 210, concept determiner 215, relationship determiner 220, ontology builder 225, and ontology refiner 227 can be processor executable instructions configured to perform any of the described functionalities herein based on received input data.

The entity extractor 210 can be configured to extract a plurality of entities and entity types (also referred to as entity categories or entity labels) from the data corpus 240. An "entity" can be a person, organization, company, place, time expression, monetary value, quantity, or any other suitable entity mapped to a corresponding entity type. NER can be completed in any suitable manner. In some embodiments, the entity extractor 210 can be configured to perform a neural-network based NER algorithm. In these embodiments, a neural network (e.g., neural network 600 of FIG. 6) is trained to recognize entity types of entities present in input data. In some embodiments, a rules-based NER process can be implemented. Such systems include IBM® System™ and IBM INFOSPHERE® Data Quality Framework (DQF).

In response to receiving input data, the NER process outputs mappings of entity instances to entity types. For example, if an individual "John Smith" is present in a document in 20 instances, "John Smith" can be mapped to the entity type "person." Thus, the NER process labels the entity "John Smith" as a person. As another example, if a place "Germany" is located in a document in 10 instances, the entity "Germany" can be mapped to the entity type "place." However, any suitable mapping of entities to entity types can be implemented, and can depend on the granularity of the label set inherent to the NER algorithm(s). For example, "Germany" can be labeled as a "place," "country," or "European Country." Thus, the granularity of the categories assigned to entities can vary depending on the NER algorithm. Ultimately, the entity extractor 210 annotates the input data by extracting entities and assigning labels thereto.

In embodiments, the entity extractor 210 can be configured to run multiple different NER algorithms on the same or separate sets of input data with the data corpus 240. Thus, different sets of labels can be received for the same input set (e.g., as received by multiple NER algorithms). For example, a first label set $L_1$ can be extracted from a first dataset $D_1$, a second label set $L_2$ can be extracted from the first dataset $D_1$, etc. (e.g., a different label set is received from the same data set based on the NER algorithm run on the data set). Alternatively, separate segments of the data corpus 240 can each have respective labels from respective NER algorithms. For example, a first label set $L_1$ can be received for a first dataset $D_1$ (e.g., a first portion of the data corpus 240) as extracted by a first NER algorithm $NER_1$, a second label set $L_2$ can be received for a second dataset $D_2$ (e.g., a second portion of the data corpus 240) as extracted by a second NER algorithm $NER_2$, etc. As an alternative example, portions of the data corpus 240 can each be run through one or more of the same NER algorithms. For example, a first portion of data of the first dataset $D_1$ can be run against a first plurality of NER algorithms to receive a first plurality of label sets $L_1, L_2, L_3 \ldots L_n$. Similarly, a second portion of data of the second dataset $D_2$ can be run against the first plurality of NER algorithms to receive a second plurality of label sets $L'_1, L'_2, L'_3 \ldots L'_n$. Thus, portions of data corpus 240 can each be labeled by a plurality of NER algorithms.

In embodiments, label sets received by NER algorithms can be used as input data for ontological classification. For example, different label sets (e.g., received from different data sources and/or NER algorithms) can be combined into a unified hierarchical label set (UHLS). Unifying the label sets into the UHLS can include comparing each label extracted by NER to concepts found in the reference ontology set 230. All labels not found in the ontology set 230 can be discarded. Thereafter, the labels of the label sets that are present in the ontology set 230 can be converted into a hierarchical tree (e.g., by a domain expert), with coarse concepts towards the top of the tree and fine-grained concepts towards the bottom of the tree. Upon generating the UHLS, assuming partial label loss (due to some labels not being present in the ontology set 230), a neural model (of neural models 245) can be trained to perform concept determination for future input data. Thus, the neural model can accurately extract concepts directly from the data corpus 240 based on the NER label sets and reference ontologies that it is trained on. For example, if a domain expert constructs the UHLS based on a set of labels matching to concepts in a reference ontology, the UHLS creation can be used as supervised learning data for one or more machine learning algorithms to generate future UHLS's based on input data.

In embodiments, neural models 245 can be configured to perform disambiguation of labels. Such a disambiguation process can be configured to identify the granularity of classification of concepts to be added to an ontology. For example, if an entity "John Smith" is labeled as "person" according to a first NER algorithm and as "doctor" according to a second NER algorithm (e.g., a label conflict exists), the disambiguation process can be configured to determine the proper label for "John Smith" based on the training of the neural model. For example, if "John Smith" is better classified as "doctor," the entity "John Smith" can be classified under the concept "doctor" within the ontology.

Disambiguation can be completed by training a model to perform neural mention and context encoding such that labels can be assigned a feature vector. This can be completed by encoding the left and right context surrounding entities using a bi-directional long short-term memory (LSTMs) model. Thereafter, using the feature vector, concept prediction can be completed using an objective function configured to map labels to concepts within the UHLS. Following the example above, if the context provides a strong indication that "John Smith" should belong to the concept "doctor" (e.g., based on medical terminology surrounding the mention "John Smith," based on "Dr." preceding "John Smith," etc.), then the neural model can be configured to classify "John Smith" as doctor. As such, if conflicting labels referring to the same entity are identified, disambiguation can be used to select the proper label for incorporation into the ontology based on a context-based neural model.

The concept determiner 215 is configured to classify the entity types (i.e., label sets) received from the entity extractor 210 into concepts of the ontology to be generated by the ontology builder 225. To do so, the concept determiner 215 can apply the above-mentioned techniques to classify labels extracted from the data corpus into concepts. For example, label sets can be compared to those in the reference ontology set 230 to identify candidate concepts for the ontology. The candidate concepts can then be hierarchically organized (e.g., into a UHLS). Disambiguation can be applied to conflicting entity labels such that they can be reclassified (conditionally) into a corresponding ontological concept. Thus, label sets received from NER algorithms can be classified into corresponding ontological concepts by the concept determiner 215. A high-level diagram depicting concept determination is shown and described with respect to FIG. 4.

The relationship determiner 220 can be configured to determine relationships between the concepts determined by the concept determiner 215. In embodiments, the relationship determiner 220 can be configured to identify relations within the reference ontology set 230 that include concepts determined by the concept determiner 215. Relation triples (e.g., relation, $concept_1$, $concept_2$) that include concepts determined by the concept determiner 215 can be regarded as candidate relations to be added to the ontology. However, relations can be determined by the relationship determiner 220 in any other suitable manner. For example, in embodiments, relations can be extracted between entities using a graph neural network model.

In embodiments, additional ontological elements, such as attributes, aliases, and axioms, can be determined by the ontology generation and refinement system 205. For example, one or more attributes of a concept can be determined based on an entity (e.g., describing a value of a concept) output by an NER classification algorithm. As another example, any attributes related to concepts determined by the concept determiner 215 present in the reference ontology set 230 can be extracted as candidate attributes to be added to the ontology. However, attribute discovery can be completed in any other suitable manner.

The ontology builder 225 can be configured to build an ontology using the determined concepts, relations, attributes, and any other applicable ontological elements. Ontology building can include utilizing an ontology language to define the ontology (e.g., in code). For example, the ontology can be generated based on the discovered ontological elements using Web Ontology Language (OWL), Ontology Inference Layer (OIL), Resource Description Framework (RDF), or any other suitable ontological language. Thus, the ontology is coded into a functional form for that can be used for information retrieval. In some embodiments, the ontology can be represented in a knowledge graph (KG) form.

The ontology refiner 227 can be configured to refine the ontology after it is generated. In embodiments, ontological refinement can include pruning ontological elements (e.g., removing extraneous or unrelated concepts and relations within the ontology). In some embodiments, ontological refinement can include appending additional ontological elements to the ontology. In some embodiments, ontological refinement can include rearranging one or more relationships or hierarchies within the ontology.

In some embodiments, the ontology refiner 227 can be configured to prune relations using a neural-based model. In embodiments, a condition can be set such that each relation in the ontology has to meet one or more properties in order to be included in the ontology. For example, such properties can include transitivity, symmetry, refinement, and coercion (depicted in FIG. 8A). If a determination is made that a relation in the ontology does not meet a set condition (e.g., transitivity, symmetry, refinement, and coercion), then the relation can be pruned from the ontology. Classifying each relation as either satisfying or not satisfying the condition can be completed by a neural model (e.g., neural network 600 depicted in FIG. 6). In embodiments, neural-based relation selection can be completed prior to generation of the ontology (e.g., by the relationship determiner 220).

Figure 3:
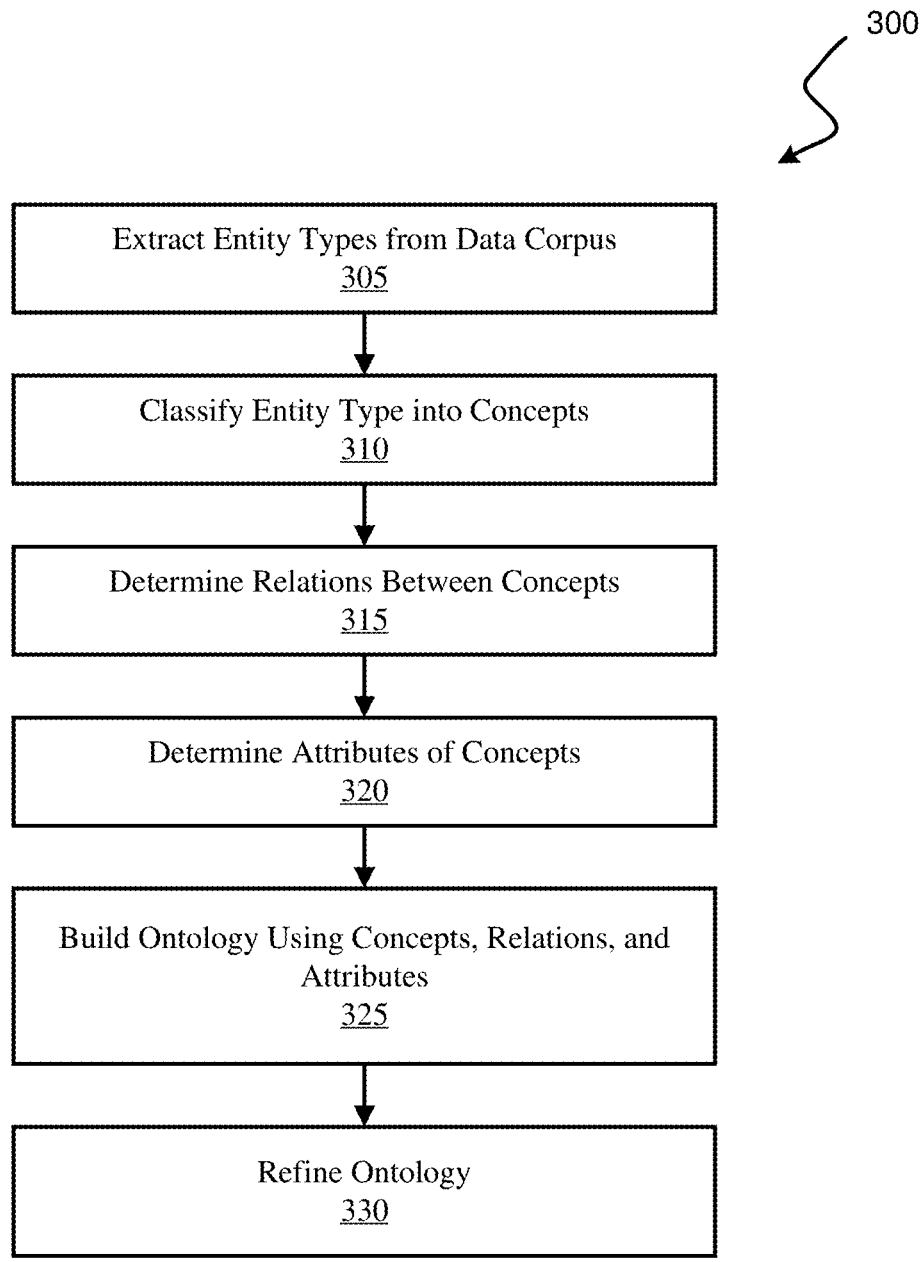
FIG. 3 is a flow-diagram illustrating a method for generating and refining an ontology, in accordance with embodiments of the present disclosure.

Referring now to FIG. 3, shown is a high-level flow-diagram illustrating a process for generating an ontology, in accordance with embodiments of the present disclosure. It is noted that the operations of FIG. 3 can be completed by one or more processing devices (e.g., devices 105, server 135, OGRS 205).

Method 300 initiates at operation 305, where entity types (i.e., a label set) are extracted from a data corpus. Extracting entity types at operation 305 can be completed the same as, or substantially similar to, entity type extraction as completed by entity extractor 210 of FIG. 2. For example, a neural-based NER or rule-based NER can be used to annotate the data of the data corpus. In embodiments, two or more distinct NER algorithms can be used to extract entities from the data corpus or portions thereof.

The entities are then classified into concepts of an ontology. This is illustrated at operation 310. Classifying extracted entities into concepts can be completed the same as, or substantially similar to, classifying entities into concepts as completed by concept determiner 215 of FIG. 2. For example, the entity types can be compared to reference ontologies to identify concepts of the reference ontology that match to the entity types. Any matching concepts can be regarded as candidate concepts for ontology generation. The candidate concepts can then be unified (e.g., using a domain expert or trained neural model) into a hierarchical structure. Disambiguation can then be performed on conflicting entity types such that the proper entity types are incorporated into the ontology.

Relations between concepts are then determined. This is illustrated at operation 315. Determining relations between concepts can be completed the same as, or substantially similar to, determining relations as performed by the relationship determiner 220 of FIG. 2. For example, any relations containing concepts which were determined at operation 310 can be regarded as candidate relations for incorporation into the ontology. As such, a set of triples in the format of $(r, c_1, c_2)$ can be output at operation 315, where $c_1$ and $c_2$ are labels output by an NER algorithm that matched to concepts of the reference ontology set. In some embodiments, the triples to be added to the final ontology can be pruned using a neural model (e.g., discussed with respect to operation 330).

Attributes of concepts are then determined. This is illustrated at operation 320. Attributes generally refer to data describing concepts. Attributes of concepts can be determined in any suitable manner. In some embodiments, attributes can be received as a part of the NER process, where values of attributes are output as annotated data from the NER algorithm run on the input data corpus. However, attribute discovery can be completed in any other suitable manner. For example, attribute discovery can be completed by analyzing the reference ontology set to extract attributes of concepts present in the reference ontologies.

An ontology is then built using the concepts, relations, attributes, and any other applicable ontological elements. This is illustrated at operation 325. Building the ontology can including programming the ontology in an ontological language. For example, the ontology can be constructed using Web Ontology Language (OWL).

The ontology is then refined. This is illustrated at operation 330. Refining the ontology can be completed the same as, or substantially similar to, refining an ontology described with respect to the ontology refiner 227 of FIG. 2. For example, one or more ontological elements (e.g., concepts, relations, attributes, etc.) can be pruned, appended, or rearranged within the ontology. In embodiments, relations not satisfying a set condition can be pruned using a neural model. For example, relations not satisfying properties such as transitivity, symmetry, refinement, and coercion (e.g., as determined by a neural model) can be removed from the ontology. This can be completed at the relationship selection stage (e.g., operation 315) or alternatively after the ontology is constructed (e.g., operation 330).

The aforementioned operations can be completed in any order and are not limited to those described. Additionally, some, all, or none of the aforementioned operations can be completed while still remaining within the spirit and scope of the present disclosure.

Figure 4:
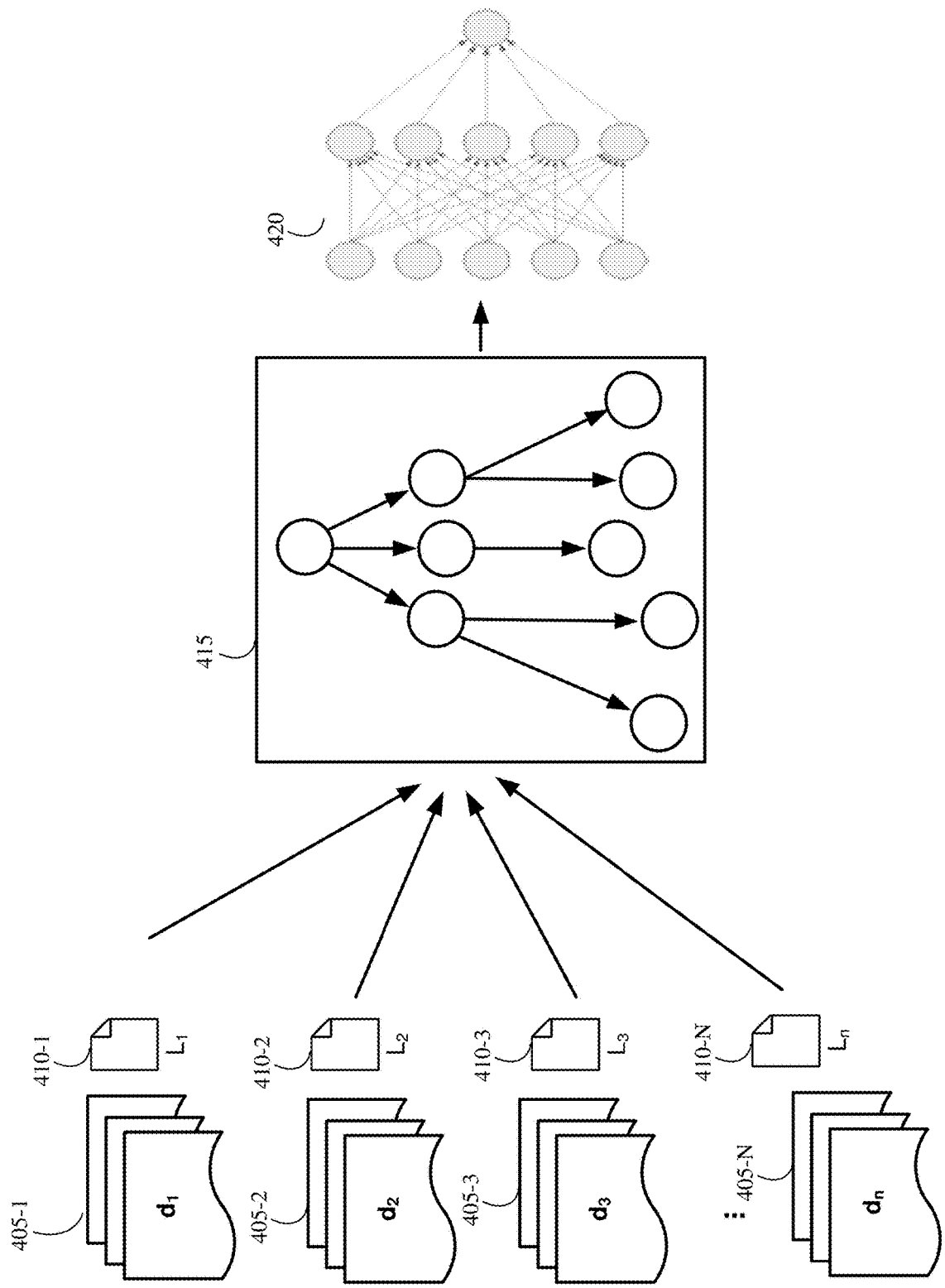
FIG. 4 is a diagram depicting the determination of concepts from input data, in accordance with embodiments of the present disclosure.

Referring now to FIG. 4, shown is a block diagram illustrating the classification of entity types (e.g., labels, categories etc.) into concepts, in accordance with embodiments of the present disclosure. In embodiments, concept determiner 215 of OGRS 205 can be configured to complete one or more of the functionalities described below.

Figure 5:
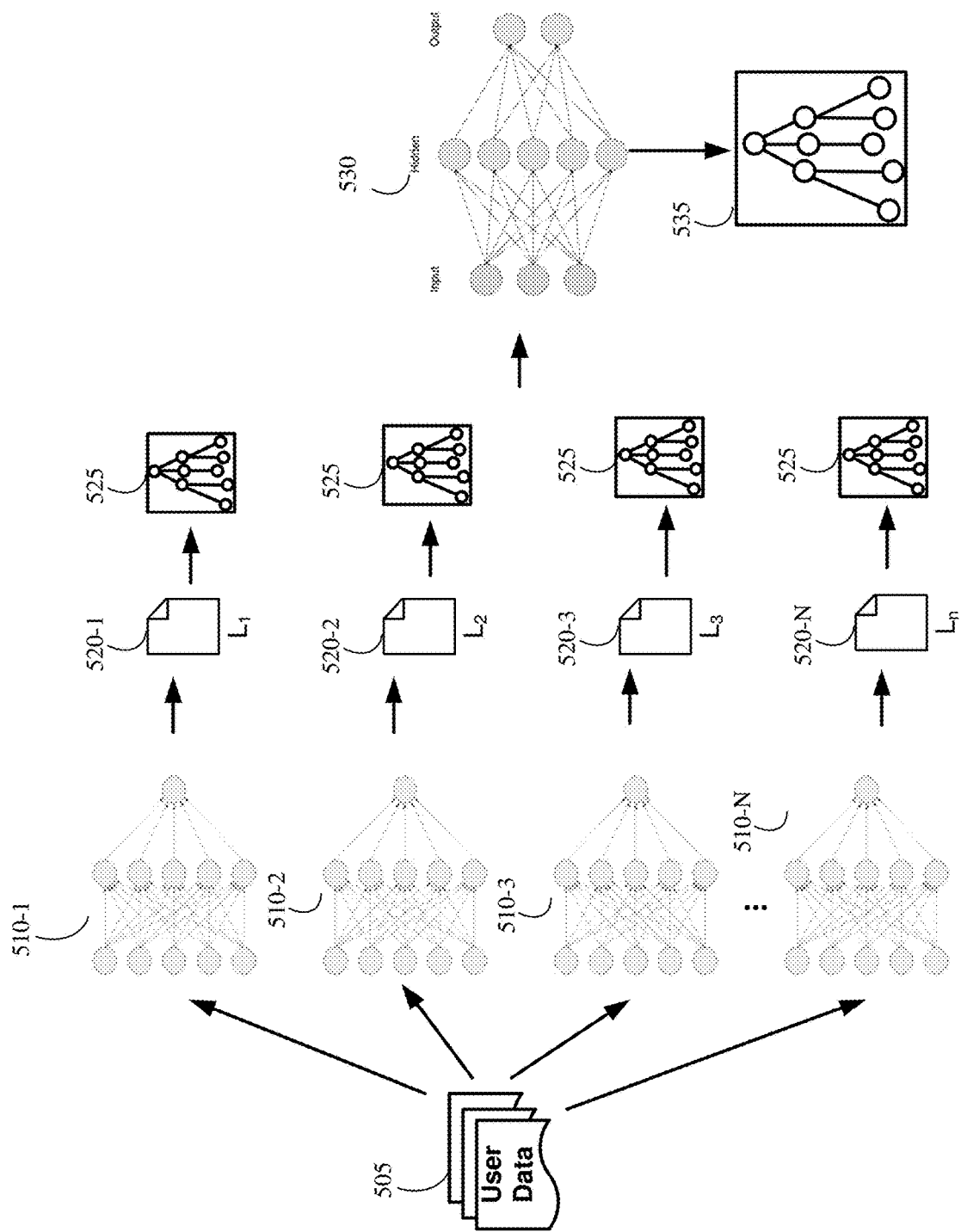
FIG. 5 is a diagram depicting the generation of an ontology by identifying relations and thereafter pruning the relations using a neural model, in accordance with embodiments of the present disclosure.

Named-entity recognition is performed on a first dataset 405-1, a second dataset 405-2, a third data set 405-3 . . . to an $N^{th}$ dataset 405-N (collectively datasets 405) to receive a corresponding first label set 410-1, a second label set 410-2, a third label set 410-3 . . . to an $N^{th}$ label set 410-N (collectively label sets 410). Each label set is thereafter compared to a set of reference ontologies (e.g., reference ontology set 230) to identify labels within each label set 410 that match to concepts of the ontologies. A unified hierarchy label set (UHLS) 415 is then generated (e.g., by a domain expert) using the labels that match to concepts of the reference ontologies, the UHLS 415 having coarse concepts toward the root node (the top) of the UHLS 415 and fine-grained towards the end of the UHLS 415. A neural model 420 can then be trained based on the generation of the UHLS (e.g., using supervised learning) such that future concept sets can be extracted from input data. In cases entities are assigned distinct labels (e.g., from different NER algorithms), a context-based neural model (not shown) can be configured to perform disambiguation such that the entity is accurately labeled. This can allow the accurate label to be incorporated as a concept in the ontology Referring now to FIG. 5, shown is a block-diagram illustrating the determination of relations from a set of user data, in accordance with embodiments of the present disclosure. In embodiments, relationship determiner 220 of OGRS 205 can be configured to complete one or more of the functionalities described below. It is noted that FIG. 4 and FIG. 5 can be independently completed, as a part of separate ontological generation processes. For example, the number of NER algorithms run on input data and the segmentation of input data fed into respective NER algorithms can differ between FIGS. 4 and 5.

As depicted in FIG. 5, a set of user data 505 is run through a first NER algorithm 510-1, a second NER algorithm 510-2, a third NER algorithm 510-3 . . . to an $N_{th}$ NER algorithm 510-N. This yields a first label set 520-1, a second label set 520-2, a third label set 520-3 . . . to an $N^{th}$ label set 520-N (collectively label sets 520) describing entities extracted from the user data 505. Each label set is matched to a set of reference ontologies 525 (e.g., reference ontologies 230 of FIG. 2) to identify matching concepts within the reference ontology set. Relations associated with the matching concepts are then extracted as candidates for ontology generation.

A neural model 530 is then used to select relations of the set of candidate relations to be incorporated into an ontology 535. The neural model 530 can be configured to perform classification as to whether or not relations satisfy one or more properties (e.g., transitivity, symmetry, refinement, and coercion). If the neural model 530 outputs that the relation does not satisfy one or more required properties, the relation is not added to the ontology 535.

FIG. 6 depicts an example neural network 600 that may be specialized to process a set of inputs, in accordance with embodiments of the present disclosure. In embodiments, the neural network 600 can be configured to classify entity types into concepts. In embodiments, the neural network 600 can be configured to prune relations based on required relation properties. In embodiments, the neural network 600 can be configured to perform disambiguation on multiple labels mapping to a same entity to facilitate proper concept selection. Inputs may include, for example, data corpus 240, data sets 405, or user data 505.

Neural network 600 may be part of a larger neural network. For example, neural network 600 may be nested within a single, larger neural network, connected to several other neural networks, or connected to several other neural networks as part of an overall aggregate neural network.

Inputs 602-1 through 602-*m* represent the inputs to neural network 600. In this embodiment, 602-1 through 602-*m* do not represent different inputs. Rather, 602-1 through 602-*m* represent the same input that is sent to each first-layer neuron (neurons 604-1 through 604-*m*) in neural network 600. In some embodiments, the number of inputs 602-1 through 602-*m* (i.e., the number represented by m) may equal (and thus be determined by) the number of first-layer neurons in the network. In other embodiments, neural network 600 may incorporate 1 or more bias neurons in the first layer, in which case the number of inputs 602-1 through 602-*m* may equal the number of first-layer neurons in the network minus the number of first-layer bias neurons. In some embodiments, a single input (e.g., input 602-1) may be input into the neural network. In such an embodiment, the first layer of the neural network may comprise a single neuron, which may propagate the input to the second layer of neurons.

Inputs 602-1 through 602-*m* may comprise one or more artifact component(s) and a relative composition that is associated with a compositional artifact. For example, inputs 602-1 through 602-*m* may comprise 10 components with their relative compositions that are associated with a seed artifact. In other embodiments, not all components and their relative compositions may be input into neural network 600. For example, in some embodiments, 30 components may be input into neural network 600, but relative compositions for only 20 components may be input into neural network 600.

Neural network 600 may comprise a number of layers of neurons (referred to as layers 604, 606, 608, 610, and 612, respectively corresponding to illustrated nodes 604-1 to 604-*m*, nodes 606-1 to 606-*n*, nodes 608-1 to 608-*o*, nodes 610-1 to 610-*p*, and node 612). Though 5 layers are shown in FIG. 6, in some embodiments, neural network 600 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 612 is treated as the output layer. Layer 612 outputs a probability that a target event will occur, and contains only one neuron (neuron 612). In other embodiments, layer 612 may contain more than 1 neuron. In this illustration no bias neurons are shown in neural network 600. However, in some embodiments each layer in neural network 600 may contain one or more bias neurons.

Layers 604-612 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 604 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 606, for example, may be a dense layer. In this example, the dense layer may process and reduce the dimensions of the feature vector (e.g., the vector portion of inputs 602-1 through 602-*m*) to eliminate data that is not contributing to the prediction. As a further example, layer 608 may be a "batch normalization" layer. Batch normalization may be used to normalize the outputs of the batch-normalization layer to accelerate learning in the neural network. Layer 610 may be any of a dropout, hidden, or batch-normalization layer. Note that these layers are examples. In other embodiments, any of layers 604 through 610 may be any of dropout, hidden, or batch-normalization layers. This is also true in embodiments with more layers than are illustrated here, or fewer layers.

Layer 612 is the output layer. In this embodiment, neuron 612 produces outputs 614 and 616. Outputs 614 and 616 represent complementary probabilities that a target event will or will not occur. For example, output 614 may represent the probability that a target event will occur, and output 616 may represent the probability that a target event will not occur. In some embodiments, outputs 614 and 616 may each be between 0.0 and 1.0, and may add up to 1.0. In such embodiments, a probability of 1.0 may represent a projected absolute certainty (e.g., if output 614 were 1.0, the projected chance that the target event would occur would be 100%, whereas if output 616 were 1.0, the projected chance that the target event would not occur would be 100%). Examples of probabilities output by neural network 600 include: a probability that a given relationship satisfies one or more required properties, a probability that a given label is accurately mapped to an entity based on context, a probability that a given label should be mapped to a particular entity over one or more other labels, a probability that a given concept is hierarchically superior to or subordinate to another concept, a probability that a given unified concept hierarchy is accurately organized, and a probability that a particular entity belongs to each respective entity type.

FIG. 6 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant. In embodiments, neural network 600 may be trained (e.g., biases and weights among nodes may be calibrated) by inputting feedback into the neural network to arrive at an expected output.

Figure 7:
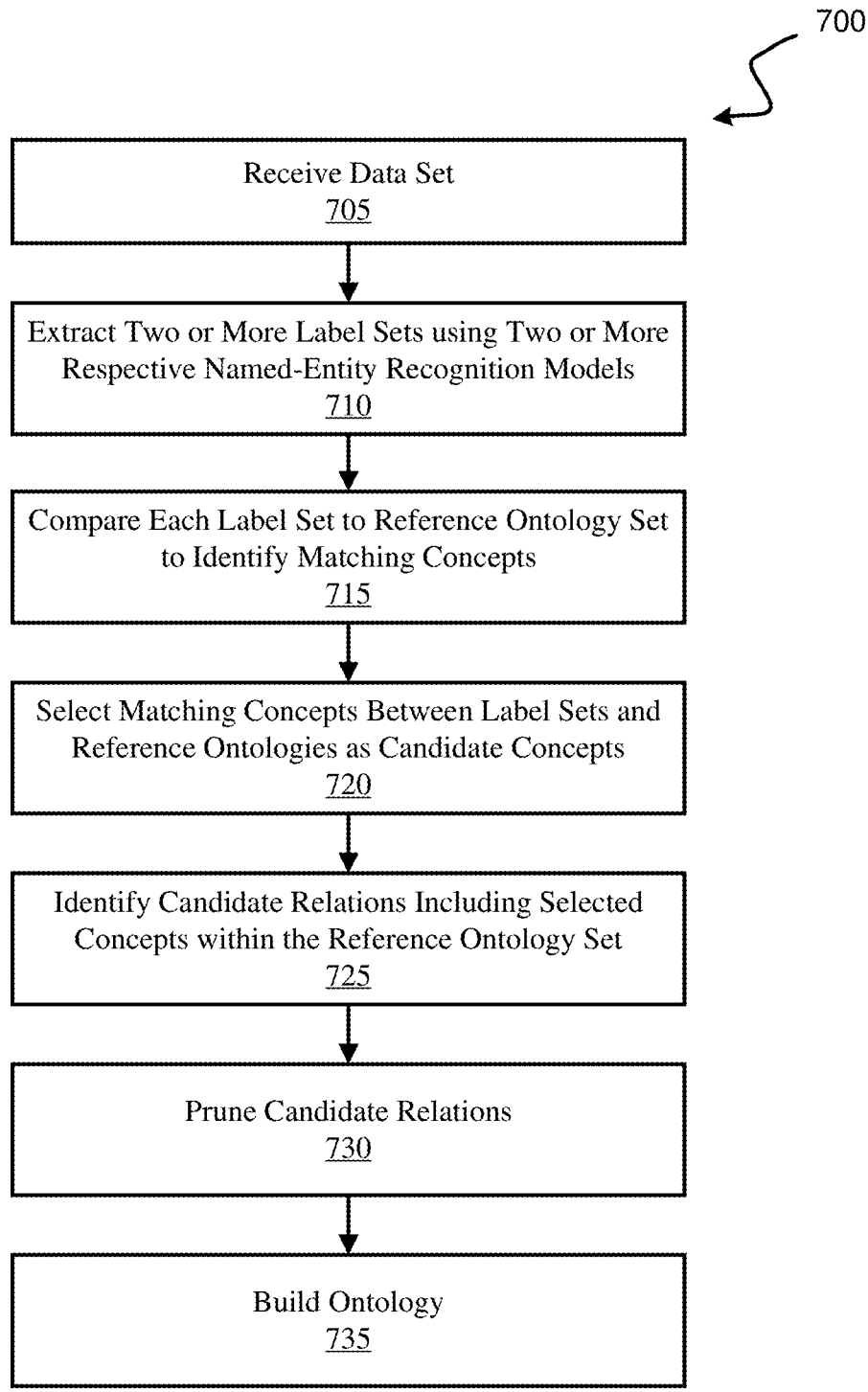
FIG. 7 is a flow-diagram illustrating an example method for building an ontology using identified relations, in accordance with embodiments of the present disclosure.

Referring now to FIG. 7, shown is an example method 700 for building an ontology, in accordance with embodiments of the present disclosure.

Method 700 initiates at operation 705, where a data set is received. Two or more label sets are then extracted using two or more respective named-entity recognition (NER) models. This is illustrated at operation 710. In embodiments, each NER model can be trained differently. For example, a first NER algorithm can be trained to recognize entities in a medical domain while a second NER algorithm can be trained to recognize entities in a business domain. Thus, the label sets received from each NER model can differ.

Each label set is then compared to a reference ontology set to identify matching concepts. This is illustrated at operation 715. The matching concepts are then selected as candidate concepts. This is illustrated at operation 720. Relations within the reference ontology set that include the candidate concepts are then identified. These relations are considered as candidate relations to be added to the ontology The candidate relations are then pruned at operation 725. Pruning candidate relations can include determining whether each candidate relation satisfies one or more required properties. If a candidate relation does not satisfy one or more required properties, the candidate relation is not added to the ontology.

The ontology is then built using the candidate concepts and candidate relations. This is illustrated at operation 735. This can be completed the same as, or substantially similar to, operation 325 of FIG. 3. For example, an ontology language can be used create the ontology.

The aforementioned operations can be completed in any order and are not limited to those described. Additionally, some, all, or none of the aforementioned operations can be completed while still remaining within the spirit and scope of the present disclosure.

Figure 8A:
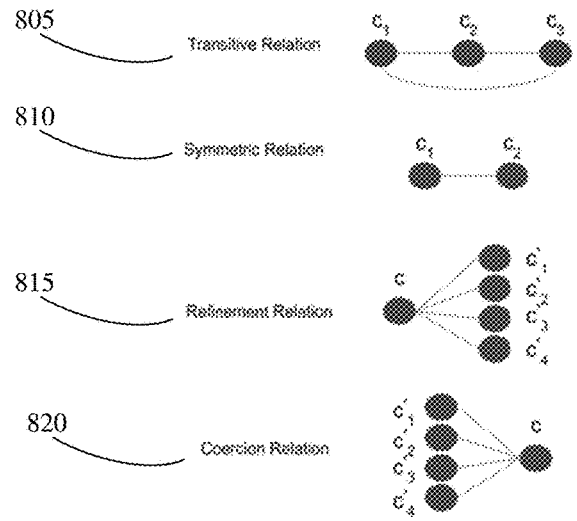
FIG. 8A is a diagram depicting types of relation properties, in accordance with embodiments of the present disclosure.

Referring now to FIG. 8A, shown are example properties of relations, in accordance with embodiments of the present disclosure. A transitive relation 805 is a relation where a first concept $c_1$ is related to a third concept $c_3$ indirectly through a second concept $c_2$. Thus, it can be said if $c_1$ is related to $c_2$ and $c_2$ is related to $c_3$ then $c_1$ is related to $c_3$. A symmetric relation 810 is a relation where a first concept $c_1$ is related to a second concept $c_2$. Thus, if $c_1$ is related to $c_2$ then $c_2$ is related to $c_1$. A refinement relation 815 is a relation where a concept c includes a set of subordinate concepts $c'_1$-$c'_4$. Thus, each subordinate concept within c is indirectly related to another subordinate concept through c. A coercion relation 820 is a relation where a set of subordinate concepts $c'_1$-$c'_4$ belong within a superclass c. Similarly, each subordinate concept within c is indirectly related to another subordinate concept through c.

Figure 8B:
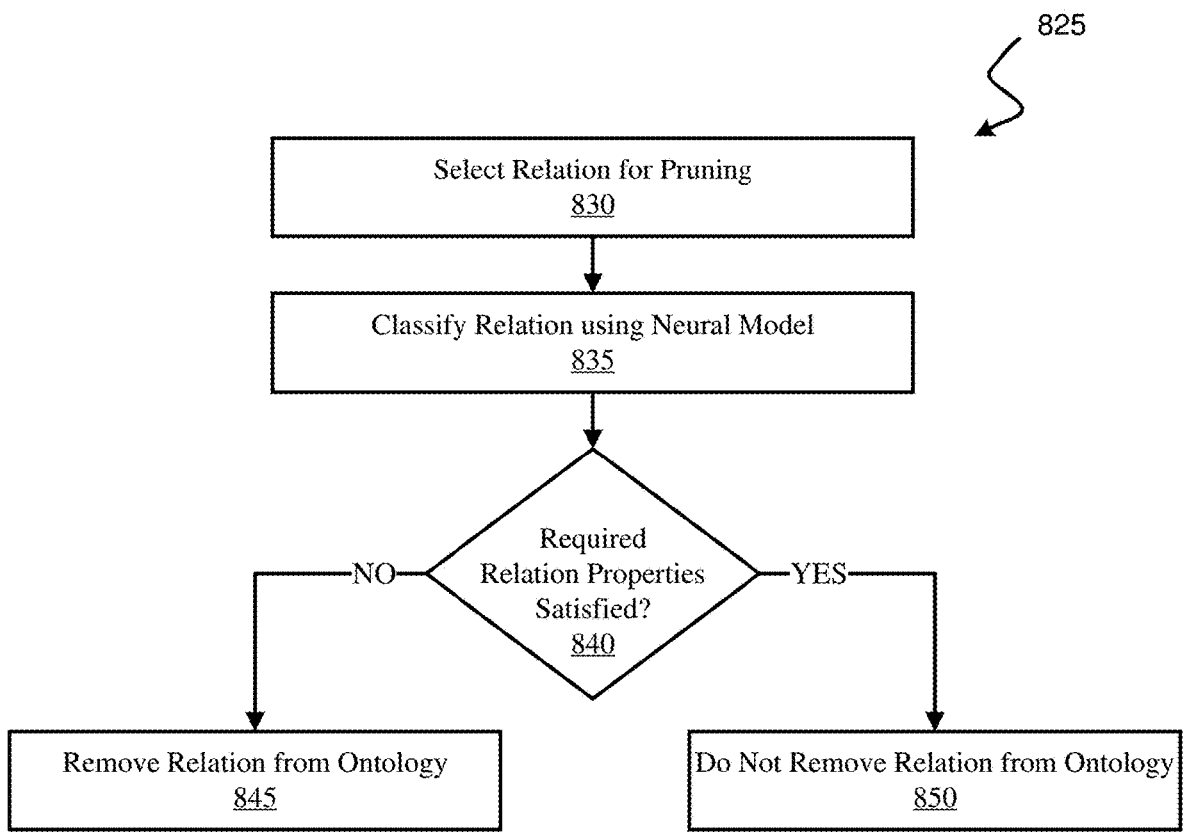
FIG. 8B is a diagram depicting a method for pruning relations using a neural model based on whether the relations satisfy relation properties, in accordance with embodiments of the present disclosure.

Referring now to FIG. 8B, shown is flow-diagram of an example method 825 for relation pruning, in accordance with embodiments of the present disclosure. It is noted that relation pruning can be completed prior to or after ontological generation.

Method 825 initiates at operation 830, where a relation is selected for pruning. In embodiments, the relation can be a candidate relation that is related to a selected concept (e.g., based on a label match between a concept in a reference ontology).

The relation is then classified using a neural model. This is illustrated at operation 835. The neural model can be trained to output a probability that a given relation satisfies one or more of the properties depicted in FIG. 8A. In embodiments, the neural model can be trained using preclassified relations (e.g., relations labeled with the properties in FIG. 8A) as supervised learning data.

A determination is then made whether required relation properties are satisfied. This is illustrated at operation 840. In some embodiments, the determination can be completed based on a threshold comparison. For example, the probability that the relation satisfies one or more properties can be compared to a probability threshold determine whether the required relation properties are satisfied. As an example, if a 0.85 probability is output that a given relation satisfies three properties: transitivity, symmetry, and refinement, then if a lower limit threshold is 0.80, the relation would satisfy the required relation properties. Conversely, if the lower limit threshold is 0.90, the relation would not satisfy the require relation properties.

If the relation does not satisfy the required relation properties, then the relation is removed from the ontology (e.g., in the case that the ontology is not yet generated, the relation removed from a list of candidate, in the case that the ontology is already generated, the relation is removed from the ontology). This is illustrated at operation 845. If the relation satisfies the required relation properties, then the relation is not removed from the ontology (e.g., in the case that the ontology is not yet generated, the relation is selected as a candidate for ontology building, in the case that the ontology is already generated, the relation is not removed from the ontology). This is illustrated at operation 850.

The aforementioned operations can be completed in any order and are not limited to those described. Additionally, some, all, or none of the aforementioned operations can be completed while still remaining within the spirit and scope of the present disclosure.

Figure 9:
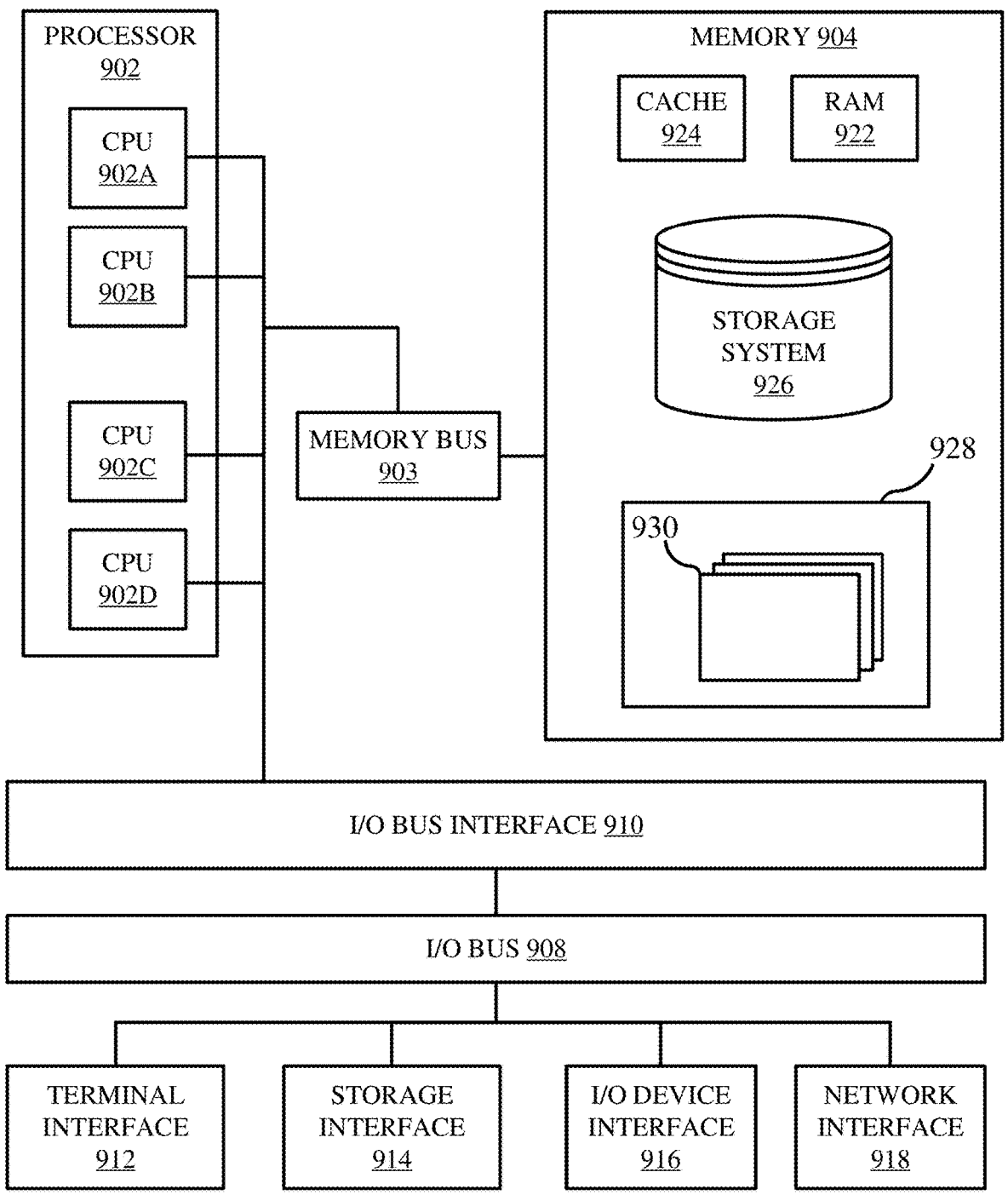
FIG. 9 is a high-level block diagram illustrating an example computer system that can be used in implementing one or more of the methods, tools, and modules, and any related functions, described herein, in accordance with embodiments of the present disclosure While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

Referring now to FIG. 9, shown is a high-level block diagram of an example computer system 901 (e.g., devices 105, server 135, OGRS 205) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 901 can comprise one or more CPUs 902, a memory subsystem 904, a terminal interface 912, a storage interface 916, an I/O (Input/Output) device interface 914, and a network interface 918, all of which can be communicatively coupled, directly or indirectly, for inter-component communication via a memory bus 903, an I/O bus 908, and an I/O bus interface unit 910.

The computer system 901 can contain one or more general-purpose programmable central processing units (CPUs) 902A, 902B, 902C, and 902D, herein generically referred to as the CPU 902. In some embodiments, the computer system 901 can contain multiple processors typical of a relatively large system; however, in other embodiments the computer system 901 can alternatively be a single CPU system. Each CPU 902 can execute instructions stored in the memory subsystem 904 and can include one or more levels of on-board cache.

System memory 904 can include computer system readable media in the form of volatile memory, such as random access memory (RAM) 922 or cache memory 924. Computer system 901 can further include other removable/non-removable, volatile/non-volatile computer system storage media. By way of example only, storage system 926 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 can include at least one program product having a set (e.g., at least one) of program modules that are configured to carry out the functions of various embodiments.

One or more programs/utilities 928, each having at least one set of program modules 930 can be stored in memory 904. The programs/utilities 928 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 can, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices can be connected directly to one or more system I/O buses.

In some embodiments, the computer system 901 can be a multi-user mainframe computer system, a single-user system, or a server computer or similar device that has little or no direct user interface, but receives requests from other computer systems (clients). Further, in some embodiments, the computer system 901 can be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components can have greater or lesser complexity than as represented in FIG. 9, components other than or in addition to those shown in FIG. 9 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
at least one memory component; and
at least one processor, wherein the at least one processor is configured to perform a method comprising:
receiving a set of input data;
creating a unified hierarchical label set (UHLS) from the set of input data, wherein creating the UHLS comprises extracting a first label set from a first portion of the set of input data using a first named-entity recognition (NER) algorithm, extracting a second label set from a second portion of the set of input data using a second NER algorithm, comparing the first and second label sets to concepts in one or more reference ontologies to remove labels not found in the one or more reference ontologies from the first and second label sets, and combining the first and second label sets to form the UHLS;

training a neural model using the UHLS to select relations for an ontology;

comparing a label set to concepts in a set of reference ontologies;

selecting labels that match to concepts in the set of reference ontologies as a candidate concept set;

identifying relations associated with the candidate concept set within the set of reference ontologies as a candidate relation set;

inputting the candidate relation set to the neural model to determine which relations in the candidate relation set satisfy required relation properties and remove relations from the candidate relation set that do not satisfy the required relation properties to improve accuracy of the candidate relation set; and building the ontology using the candidate concept set and the candidate relation set output by the neural model.

2. The system of claim 1, wherein each respective ontology of the set of reference ontologies covers a distinct domain.

3. The system of claim 1, wherein disambiguation is performed on at least one entity of a set of entities extracted from the set of input data in response to the at least one entity initially being mapped to at least two labels such that a proper label of the at least two labels is selected.

4. The system of claim 3, wherein the disambiguation includes using a bi-directional long short-term memory (LSTM) model based on left and right context of the at least one entity within the set of input data.

5. A method comprising:

receiving a set of input data;

creating a unified hierarchical label set (UHLS) from the set of input data, wherein creating the UHLS comprises extracting a first label set from a first portion of the set of input data using a first named-entity recognition (NER) algorithm, extracting a second label set from a second portion of the set of input data using a second NER algorithm, comparing the first and second label sets to concepts in one or more reference ontologies to remove labels not found in the one or more reference ontologies from the first and second label sets, and combining the first and second label sets to form the UHLS;

training a neural model using the UHLS to select relations for an ontology;

comparing a label set to concepts in a set of reference ontologies;

selecting labels that match to concepts in the set of reference ontologies as a candidate concept set;

identifying relations associated with the candidate concepts within the set of reference ontologies as a candidate relation set;

inputting the candidate relation set to the neural model to determine which relations in the candidate relation set satisfy required relation properties and remove candidate relations from the candidate relation set that do not satisfy the required relation properties to improve accuracy of the candidate relation set; and building the ontology using the candidate concept set and the candidate relation set output by the neural model.

6. The method of claim 5, wherein each respective ontology of the set of reference ontologies covers a distinct domain.

7. The method of claim 5, wherein disambiguation is performed on at least one entity of a set of entities extracted from the set of input data in response to the at least one entity initially being mapped to at least two labels such that a proper label of the at least two labels is selected.

8. The method of claim 7, wherein the disambiguation includes using a bi-directional long short-term memory (LSTM) model based on left and right context of the at least one entity within the set of input data.

9. A computer program product comprising one or more computer readable storage media, and program instructions collectively stored on the one or more computer readable storage media, the program instructions comprising instructions configured to cause one or more processors to perform a method comprising:

receiving a set of input data;

creating a unified hierarchical label set (UHLS) from the set of input data, wherein creating the UHLS comprises extracting a first label set from a first portion of the set of input data using a first named-entity recognition (NER) algorithm, extracting a second label set from a second portion of the set of input data using a second NER algorithm, comparing the first and second label sets to concepts in one or more reference ontologies to remove labels not found in the one or more reference ontologies from the first and second label sets, and combining the first and second label sets to form the UHLS;

training a neural model using the UHLS to select relations for an ontology;

comparing a label set to concepts in a set of reference ontologies;

selecting labels that match to concepts in the set of reference ontologies as a candidate concept set;

identifying relations associated with the candidate concepts within the set of reference ontologies as a candidate relation set;

inputting the candidate relation set to the neural model to determine which relations in the candidate relation set satisfy required relation properties and remove candidate relations from the candidate relation set that do not satisfy the required relation properties to improve accuracy of the candidate relation set; and building the ontology using the candidate concept set and the candidate relation set output by the neural model.

10. The computer program product of claim 9, wherein disambiguation is performed on at least one entity of a set of entities extracted from the set of input data in response to the at least one entity initially being mapped to at least two labels such that a proper label of the at least two labels is selected.

11. The computer program product of claim 10, wherein the disambiguation includes using a bi-directional long short-term memory (LSTM) model based on left and right context of the at least one entity within the set of input data.

12. The computer program product of claim 9, further comprising training the neural model using the UHLS as supervised learning data.

* * * * *